US008600589B2

(12) United States Patent
Mendez-Rodriguez et al.

(10) Patent No.: US 8,600,589 B2
(45) Date of Patent: Dec. 3, 2013

(54) POINT CLOUD VISUALIZATION OF ACCEPTABLE HELICOPTER LANDING ZONES BASED ON 4D LIDAR

(75) Inventors: Javier Mendez-Rodriguez, Gainesville, VA (US); Christopher T. Rodgers, Adamstown, MD (US)

(73) Assignee: Exelis, Inc., McLean, VA (US)

( * ) Notice: Subject to any disclaimer, the term of this patent is extended or adjusted under 35 U.S.C. 154(b) by 0 days.

(21) Appl. No.: 13/454,158

(22) Filed: Apr. 24, 2012

(65) Prior Publication Data

US 2013/0282208 A1    Oct. 24, 2013

(51) Int. Cl.
*G06F 19/00*    (2011.01)
*B64D 45/08*    (2006.01)

(52) U.S. Cl.
USPC .............................. 701/16; 701/17; 73/178 T

(58) Field of Classification Search
USPC ..................... 701/16, 17; 73/178 T
See application file for complete search history.

(56) References Cited

U.S. PATENT DOCUMENTS

| 7,106,217 | B2 | 9/2006 | Judge et al. |
|---|---|---|---|
| 7,642,929 | B1 | 1/2010 | Pinkus et al. |
| 7,692,571 | B2 | 4/2010 | Lovberg et al. |
| 7,908,077 | B2 | 3/2011 | Smith et al. |
| 8,068,949 | B2 | 11/2011 | Duggan et al. |
| 2010/0100269 | A1 | 4/2010 | Ekhaguere et al. |
| 2011/0285981 | A1 | 11/2011 | Justice et al. |

FOREIGN PATENT DOCUMENTS

| EP | 2 224 263 A1 | 9/2010 | |
|---|---|---|---|
| WO | WO2007067192 A2 * | 6/2007 | ............. G06F 19/00 |

OTHER PUBLICATIONS

Whalley, Matthew; Schulein, Gregory; Theodore, Colin; and Takahashi, Marc; "Design and Flight Test Results for a Hemisspherical Ladar Developed to Support Unmanned Rotorcraft Urban Operations Research", American Helicopter Society 64th Annual Forum, Montreal, Canada, Apr. 29-May 1, 2008.
Zhu, X; Church, P. and Labrie, M.; "LIDAR for Obstacle Detection During Helicopter Landing"; Laser Radar Technology and Application XIII, Proc. of SPIE vol. 6950 69500T, 2008.
Takahashi, M.D; Abershitz, Avi; Rubinets, Rafael; Whalley, M.; "Evaluation of Safe Landing Area Determination Algorithms for Autonomous Rotorcraft Using Site Benchmarking"; American Helicopter Society 67TH Annual Forum, Virginia Beach, VA, US, May 3-5, 2011.
Sebastian Scherer et al., "Online Assessment of Landing Sites", American Institute of Aeronautics and Astronautices Paper AIAA 2010, Apr. 20-22, 2010, pp. 1-14.
International Search Report dated Jul. 22, 2013, for Appl. No. PCT/US2013/035063.

* cited by examiner

*Primary Examiner* — Mary Cheung
*Assistant Examiner* — Brian P Sweeney
(74) *Attorney, Agent, or Firm* — RatnerPrestia

(57) ABSTRACT

A processor calculates a safe landing zone for an aircraft. The processor executes the following steps: (a) converting 4D point cloud data into Cartesian coordinates to form a height map of a region; (b) segmenting the height map to form boundaries of an object in the region; and (c) determining maximum height within the boundaries of the object. Also included are (d) determining if the maximum height is greater than a predetermined height to form a vertical obstruction (VO) in the region; and (e) determining if the VO is in the line of sight (LOS) of the aircraft to classify the landing zone as safe or unsafe. The processor further includes the step of: (f) forming a slope map over the height map.

19 Claims, 15 Drawing Sheets

| -1 | -1 | -1 |
|----|----|----|
| -1 | 9  | -1 |
| -1 | -1 | -1 |

FIG. 5A

| Z(i-1,j-1) | Z(i,j-1) | Z(i+1,j) |
|------------|----------|----------|
| Z(i-1,j)   | Z(i,j)   | Z(i+1,j) |
| Z(i-1,j-1) | Z(i+1,j) | Z(i+1,j+1) |

FIG. 5B

|        | i+1,j |        |
|--------|-------|--------|
| i,j-1  | i,j   | i,j+1  |
|        | i-1,j |        |

FIG. 5C

POINT CLOUD VISUALIZATION OF ACCEPTABLE HELICOPTER LANDING ZONES BASED ON 4D LIDAR

FIELD OF THE INVENTION

The present invention relates, in general, to visualization of point cloud data derived from a light detection and ranging (LIDAR) system. More specifically, the present invention relates to visualization of acceptable helicopter landing zones using four dimensional (4D) data from a LIDAR system.

BACKGROUND OF THE INVENTION

Three-dimensional (3D) type sensing systems are commonly used to generate 3D images of a location for use in various applications. For example, such 3D images are used for creating a safe training environment for military operations or civilian activities; for generating topographical maps; or for surveillance of a location. Such sensing systems typically operate by capturing elevation data associated with the location of the target. One example of a 3D type sensing system is a Light Detection and Ranging (LIDAR) system. The LIDAR type 3D sensing systems generate is data by recording multiple range echoes from a single pulse of light and generating a frame, sometimes referred to as an image frame. Accordingly, each image frame of LIDAR data includes a collection of points in three dimensions (3D point cloud), which correspond to multiple range echoes within a sensor's aperture. These points can be organized into "voxels" which represent values on regular grid in a three dimensional space. Voxels used in 3D imaging are analogous to pixels used in the context of 2D imaging devices. These frames can be processed to reconstruct a 3D image of the location of the target. In this regard, each point in the 3D point cloud has an individual x, y and z value, representing the actual surface within the scene in 3D.

The 3D point cloud as a dataset is composed of spatial measurement of positions in 3D space (x, y, z), where x and y are cross-range spatial positions and z is height. The 3D dataset is generated by systems capable of scanning surfaces, such as stereo paired cameras, radars, laser detection and ranging (LADAR) sensors, etc. This 3D dataset has been used to estimate acceptable landing zones in both civilian and military communities.

Providing information to a pilot landing an aircraft requires an ability to identify safe zones in non-cooperative environments. Non-cooperative environments are zones where there are not enough information about pre-positioned objects, landing area markings, GPS, etc. These sites may also include unknown information about terrain features and obstacles.

A commonly used system in landing zone scenarios includes stereo pair cameras. Stereo pair cameras are capable of estimating range to a landing zone using parallax. Stereo pair cameras have been tested in unmanned aircraft vehicles (UAV) for automatic landing of helicopters in non-cooperative environments.

Current UAV landing zone algorithms are based on what is referred to as a safe landing area determination (SLAD) algorithm, which uses a 3D point cloud dataset to generate a hazard map. The hazard map is used to determine vertical obstacles and landing area slope. The SLAD algorithm searches for locations that pass two key requirements regarding the obstacles and landing area slope. The slope is used to determine values that are larger than a pre-defined slope threshold value. Vertical obstructions are determined by roughness of the terrain, or a hazard map which is based on the absolute value of the hazard map minus the filtered hazard map. The algorithm uses the roughness map to determine regions larger than a pre-defined roughness threshold. Based on these, a map of acceptable regions is created and filtered to avoid regions that are too close to hazards. Finally, the regions are selected by total area available for landing and compared to the aircraft size requirements.

A major drawback of the SLAD algorithm is that it does not provide the landing zone area in real-time. The SLAD algorithm, applied with stereo pair cameras, acquires the information several minutes before the landing process. The UAV then hovers over an area and waits for the landing zone calculation before proceeding with the landing process.

As it will be explained, the present invention advantageously provides real-time visualization of a calculated landing site to the pilot. Using the present invention, the pilot does not have to hover for several minutes above a possible is landing site and, instead, may approach the landing site immediately upon determining that the site is acceptable to the aircraft.

SUMMARY OF THE INVENTION

To meet this and other needs, and in view of its purposes, the present invention provides a method for selecting a safe landing zone for an aircraft. The method includes the steps of: receiving 4 dimensional (4D) point cloud data as sequential image frames; referencing each image frame to geographic coordinates; selecting a land region in each image frame; first filtering the land region to select a landing zone for the aircraft; and second filtering the landing zone to select a safe landing zone for the aircraft.

Receiving the 4D point cloud data includes receiving the 4D point cloud data from a LADAR or LIDAR system. Referencing each image frame includes using a global positioning system (GPS) or an inertial system to transform the 4D point cloud data into x, y, z geographic coordinates as a function of time, t.

Selecting the land region includes determining whether a portion of an image frame includes a land region or a water region; and preventing further processing of the portion, after determining that the portion is a water region. In addition, the method transfers the portion of the image frame to the step of first filtering, after determining that the portion is a land region.

First filtering includes the steps of:
forming a height map of the land region, the height map including pixel values of height over the land region,
detecting edges of an object in the height map, the edges forming boundaries of the object,
finding a maximum height within the boundaries of the object, and
classifying the object as a vertical obstruction (VO), if the maximum height is larger than a predetermined VO threshold value.

Detecting the edges includes the steps of:
applying a fast Fourier transform (FFT) over the height map to obtain height in a frequency domain,
calculating gradients of the height in the frequency domain, wherein the gradients define the edges, and
representing the edges as "ones" and other portions of the height map as "zeroes".

The method further includes the steps of:
forming a slope map over the height map, in which a slope of a pixel of interest is based on 4-neighbors of pixels surrounding the pixel of interest, and determining roughness over the height map, in which roughness includes a standard deviation of height values greater than 0.3.

First filtering includes the steps of:

forming a VO map representing vertical obstructions in the land region, forming a slope map representing slopes of data points in the land region; and second filtering includes the step of:

moving a mask, defined by a predetermined area for landing, over the land region to select the safe landing zone for the aircraft.

The safe landing zone includes (a) VOs that are less than a predetermined height within the moving mask and (b) slopes that are less than a standard deviation of height less than 0.3 within the moving mask.

The method further includes the steps of:

calculating a funnel extending from a center of a landing zone, wherein the funnel is defined by a line of sight (LOS) projected from the aircraft to the center of the landing zone, and having a height formed by an altitude of the aircraft above the landing zone, and classifying the landing zone as a safe landing zone, when a VO is outside the funnel.

First filtering and second filtering may be performed by parallel processors. The first and second filtering are also executed during a time period sufficient to provide landing visualization in real-time.

Another embodiment of the present invention is a system for determining a landing zone for an aircraft. The system includes a processor for receiving 4 dimensional (4D) point cloud data from a sensor, the data defined by sequential image frames. The processor converts each image frame into Cartesian coordinates (x, y, z) to form a height map, in which x and y are a function of a scanning angle of the sensor and z is height. The processor is configured to segment the height map into boundaries of a respective object in the image frame, and find a maximum height within the boundaries of the respective object to form a vertical obstruction (VO) map. The processor is also configured to mathematically move a mask over the VO map, wherein the mask is based on a predetermined landing area required for the aircraft. A visualization system is included for displaying the mask over the VO map for landing the aircraft.

The processor is configured to perform the following tasks:

calculating a funnel extending from a center of a landing zone, wherein the funnel is defined by a line of sight (LOS) projected from the aircraft to the center of the landing zone, and having a height formed by an altitude of the aircraft above the landing zone, and classifying the landing zone as a safe landing zone, when a VO is outside the funnel.

In yet another embodiment, the present invention is a processor for calculating a safe landing zone for an aircraft. The processor executes the following steps:

(a) converting 4D point cloud data into Cartesian coordinates to form a height map of a region;

(b) segmenting the height map to form boundaries of an object in the region;

(c) determining maximum height within the boundaries of the object, (d) determining if the maximum height is greater than a predetermined height to form a vertical obstruction (VO) in the region; and (e) determining if the VO is in the line of sight (LOS) of the aircraft to classify the landing zone as safe or unsafe.

The processor also executes the following additional steps:

(f) determining whether the 4D point cloud data is that of land or water; and (g) preventing execution of steps (a) through (e), if the 4D point cloud data is that of water.

A first processor may execute step (a) and a second processor may execute at least step (b). The first and second processors are configured to execute the steps in parallel.

The processor provides a map of the landing zone to a visualization system during a time period sufficient for real-time landing of the aircraft.

It is understood that the foregoing general description and the following detailed description are exemplary, but are not restrictive, of the invention.

BRIEF DESCRIPTION OF THE DRAWINGS

The invention may be best understood from the following detailed description when read in connection with the accompanying figures, with like elements having the same reference numerals:

FIG. 5A is an example of an enhanced filter mask in the spatial domain, in accordance with an embodiment of the present invention.

FIG. 5B is an example of a mask for storing height values based on a height map in the frequency domain, in accordance with an embodiment of the present invention.

FIG. 5C is an example of a mask used to compute slope of terrain, in accordance with an embodiment of the present invention.

DETAILED DESCRIPTION OF THE INVENTION

Figure 1:
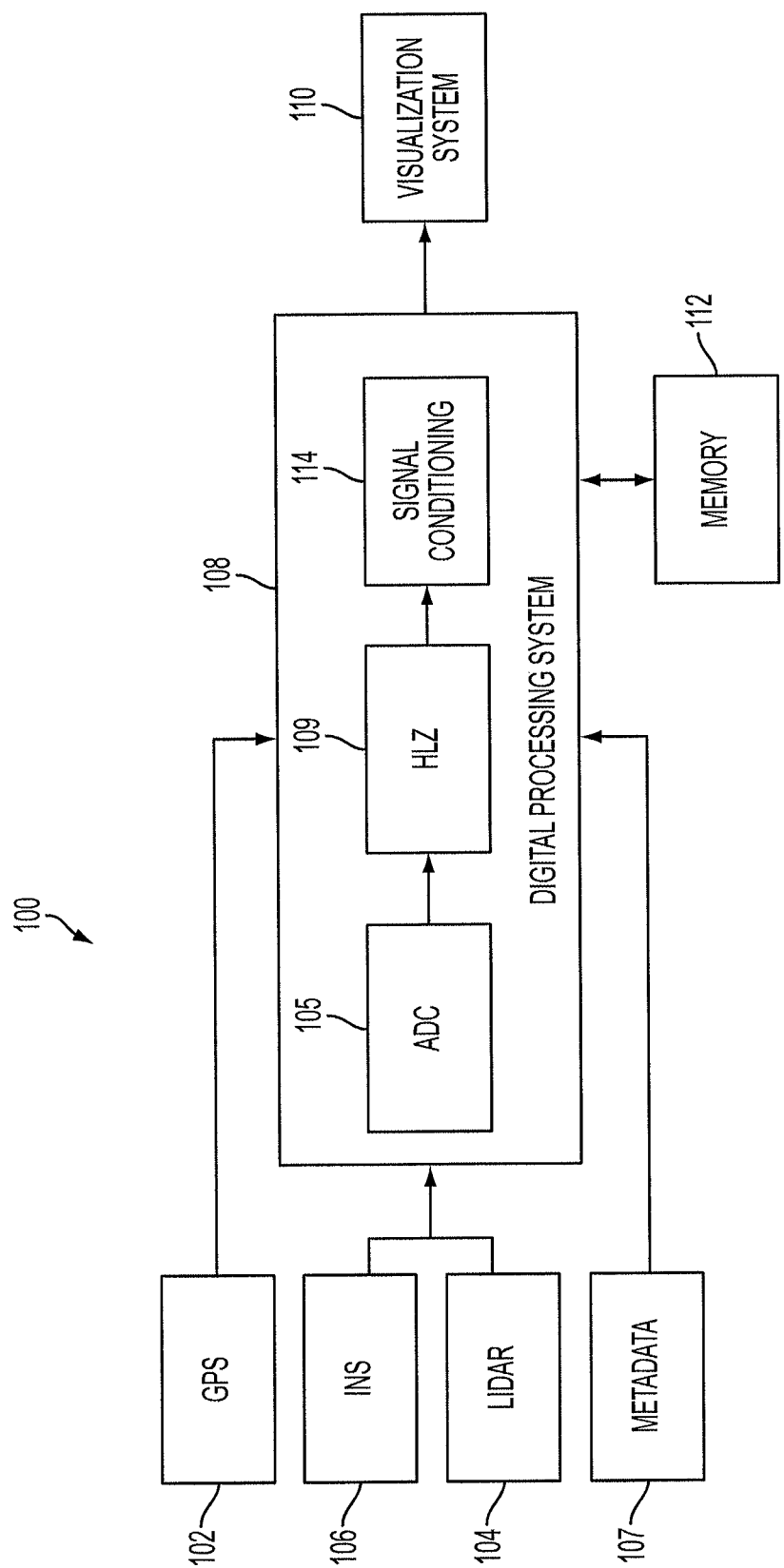
FIG. 1 is a block diagram of a system for determining in real-time an acceptable landing site for an aircraft using point cloud data, in accordance with an embodiment of the present invention.

As will be explained, the present invention processes point cloud data, in the x, y, z format, as a function of time (t). This data is obtained and processed in real-time by system 100, for example, shown in FIG. 1. As shown, system 100 includes GPS 102, LADAR (or LIDAR) 104, inertial measuring unit (IMU) or inertial navigation system (INS) 106 and metadata input module 107 configured to provide information to processor(s) 108. The LADAR operates the same way as a video camera, providing a sequence of image frames (x, y, z format) as a function of time (t). For example, the LADAR may operate at 30 frames per second. Thus, the LADAR provides 4-dimensional (4D) data, advantageously for real-time applications. It will be appreciated that the terms LADAR and LIDAR are used interchangeably herein.

The processor 108, or several processors 108 may include any computer, or multiple computers, executing feature extraction algorithms, or processing geo-referenced and non-geo-referenced point cloud data. Although a computer may be embodied in the processor, as a programmed general purpose computer, it is preferable to use either a field-programmable gate array (FPGA), or an application specific integrated circuit (ASIC) in a wired hardware arrangement, in order to achieve optimum computer operation. A computer embodied in the form of an FPGA or an ASIC may often be made to perform a particular function in a shorter time, with lower power requirement and with lowered weight and size penalties, as compared to a software programmed general purpose computer.

The processor 108 may interface with storage device 112, or several storage devices 112 for providing memory to execute the algorithms required for determining an acceptable landing zone in real-time. Landing zone maps, which may be filtered or unfiltered, are provided to a pilot by way of display 110, or several displays 110. In case of a remotely piloted vehicle, the display, which is also referred to herein as visualization system 110, may be located remotely from system 100.

As shown in FIG. 1, processing system 108 combines the LIDAR/LADAR system with the inertial navigation system (INS) and the ground positioning system (GPS) unit of the aircraft to generate ground referenced point cloud data. Next, combining the ground referenced point cloud data with geographic information system (GIS) data, the processing system determines if the aircraft is flying over a body of water. If the helicopter (or aircraft) is above a body of water, the helicopter landing zone (HLZ) method (or algorithm), generally designated as 109, is not executed.

Otherwise, the HLZ algorithm is turned ON for detecting the landing zones in real-time. In the present invention, the pilot has an option to activate or deactivate the HLZ algorithm. The processing of the HLZ algorithm is implemented in a digital signal processor (DSP) which is sufficiently fast to operate in real-time.

The DSP 108 receives metadata from metadata input module 107, the GIS data, weather, mission, etc. are included in the metadata. The signals processed by DSP 108 are preferably in a digital format and, therefore, an ADC 105 is the first unit available in the processor.

The HLZ algorithm preferably includes at least a 32 bit real-time DSP card operating at 10 GHz. With the preferred card, the system has sufficient power for processing and streaming point cloud data in real-time and may also use LIDAR sensors having high data samples. Inside the DSP, a signal conditioning unit 114 is included to manipulate the output of HLZ 109 to match to the required input into visualization system 110. The visualization system may include an open graphics development (OGD) board which may use a field-programmable gate array (FPGA) chip.

Figure 2:
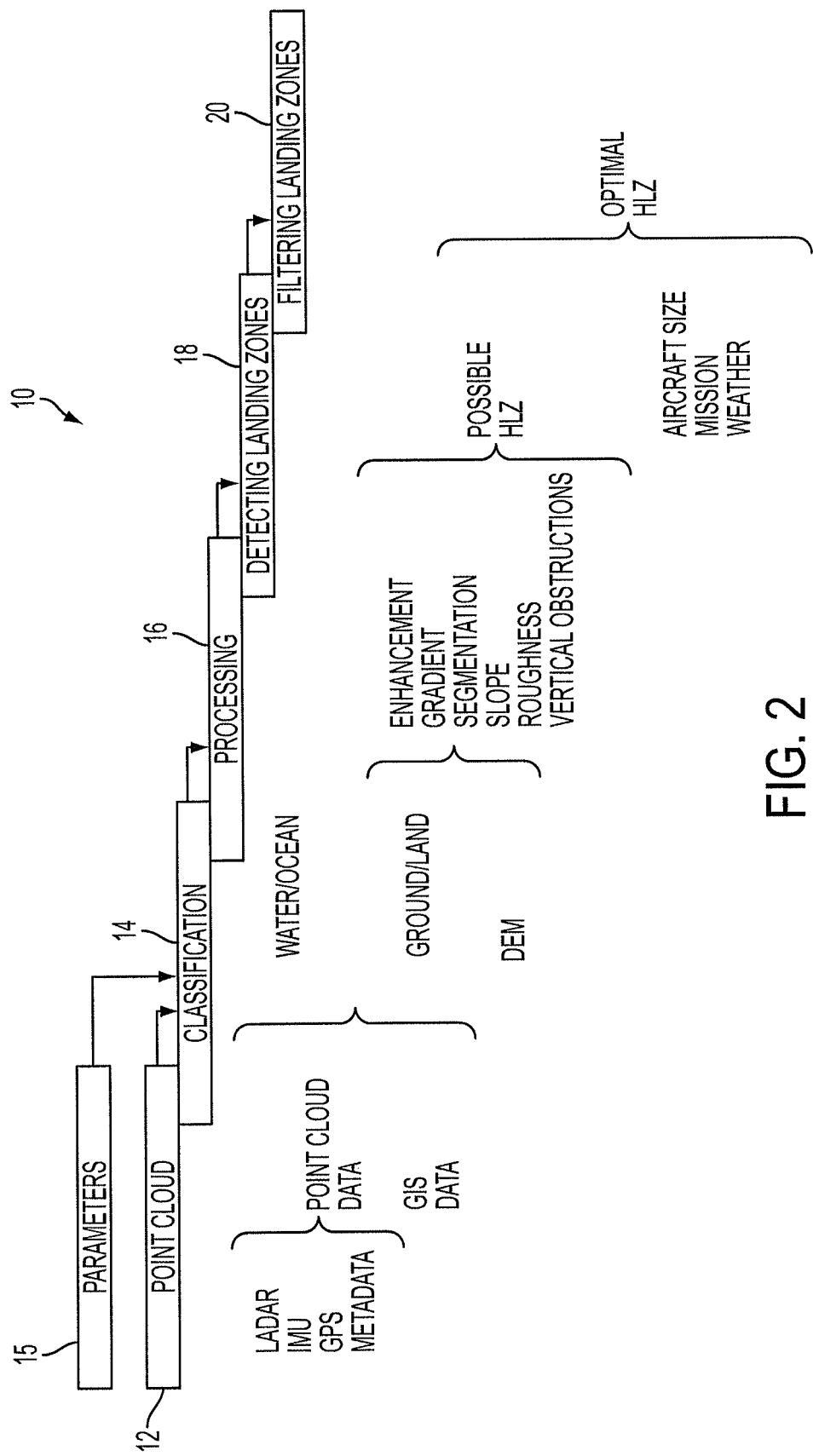
FIG. 2 is a flow diagram of a method for determining in real-time an acceptable landing site for an aircraft using point cloud data, in accordance with an embodiment of the present invention.
Figure 3:
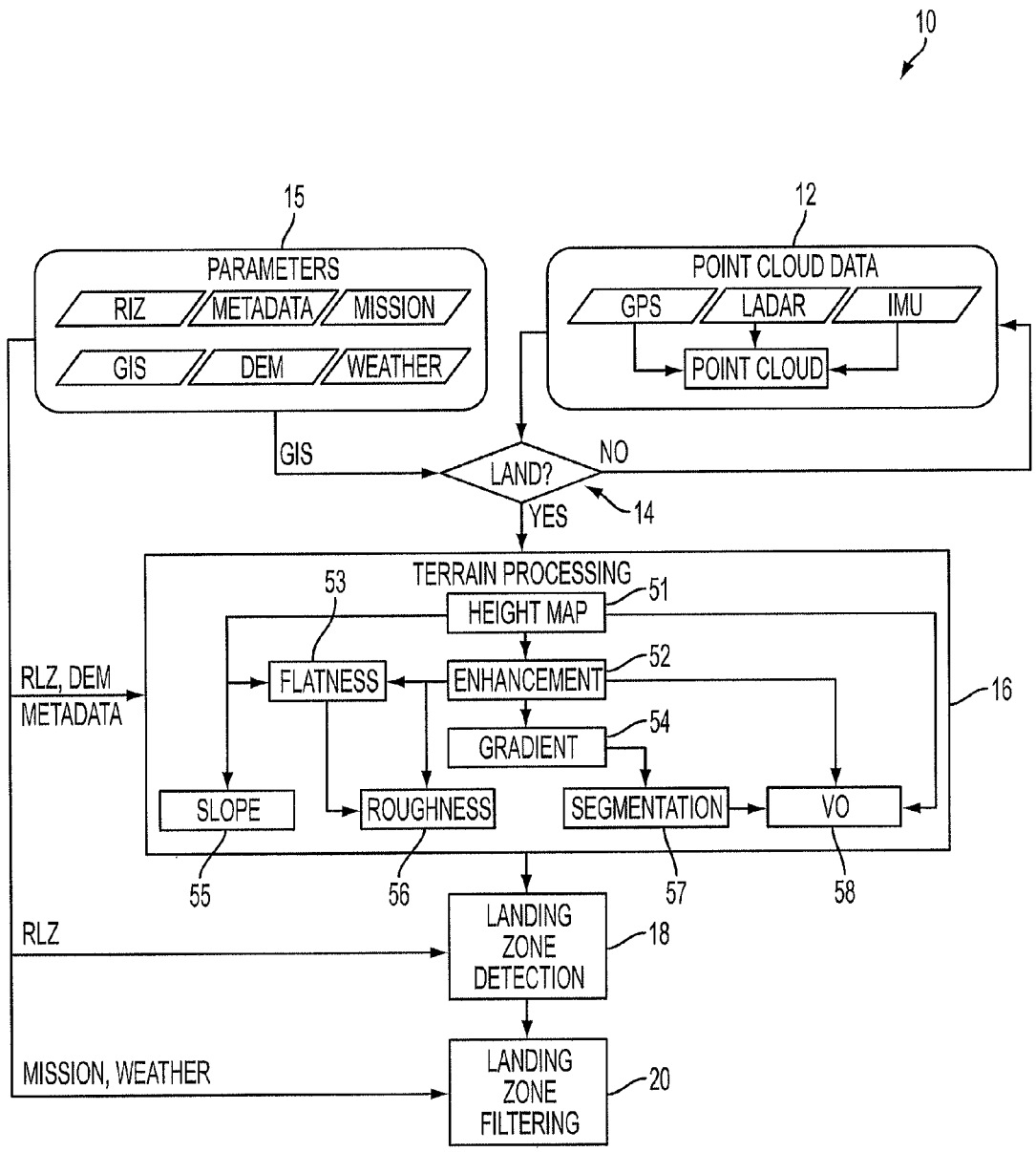
FIG. 3 is a flow diagram of another method for determining in real-time an acceptable landing site for an aircraft using point cloud data, in accordance with an embodiment of the present invention.
Figure 4:
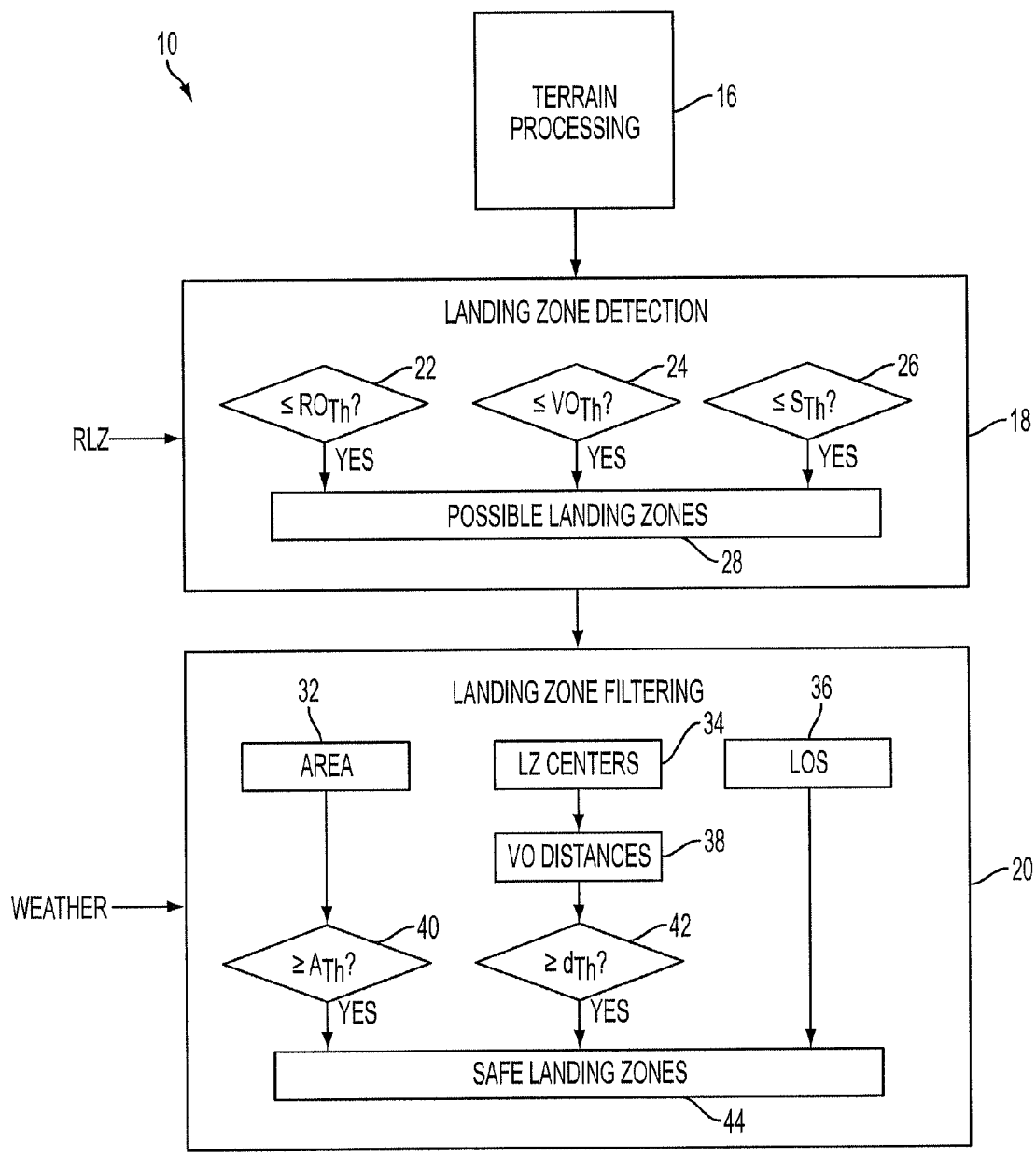
FIG. 4 is a flow diagram of a portion of the method shown in FIG. 3, including detecting a landing zone and filtering the landing zone, in accordance with an embodiment of the present invention.

Referring now to FIGS. 2, 3 and 4, there is shown system 10 for providing real-time identification of acceptable landing zones for manned and unmanned aircraft. System 10 includes several processing modules, such as point cloud module 12 for generating a point cloud dataset based on input signals from a LADAR, an IMU, a GPS and various metadata inputs. Relevant geographic information system (GIS) data from the GPS (as an example) is also provided from parameters module 15 to classification module 14. Also included in system 10 are several other processing modules, such as terrain processing module 16, landing zone detection module 18 and landing zone filtering module 20. The aforementioned modules may reside in processor(s) 108, as shown in FIG. 1, and may include any computer, FPGA or ASIC.

It will be appreciated that the modules execute algorithms that are intended for real-time to near real-time feature extraction for the purpose of identifying acceptable landing zones for manned and unmanned aircraft. However, the algorithms are diverse enough for time series and for large static LADAR datasets. Static point clouds may be used by the intelligence community for planning military and civilian missions, and as such, feature extraction is a necessary tool. The algorithms may process geo-referenced and non geo-referenced point cloud data, and may extract possible landing zones without a priori information of the landing site. Any additional data, such as metadata, adds to the fidelity of the resulting product.

In order to segment a frame of point cloud data for feature extraction specific to safe landing zones, key scene environmental factors are considered by the present invention. Such features include surface conditions, potential obstacles, ground slope (or grade), aircraft approach and departure directions, weather (e.g. wind speed and direction), atmospheric density as a function of altitude, loads, number of aircraft, and landing formations. However, a very important factor is the required landing area and shape, as stated by the aircraft's requirements.

An acceptable landing zone may be weighted by specific constraints, such as ground slope conditions, terrain roughness, and specific displacement from hazards or obstacles. Most of these constraints may be provided from the specifics of size, weight, and rotor lengths of the aircraft. An algorithm may further weigh each acceptable landing zone by individual metadata sources. Such metadata sources may include GPS and other geographic information system (GIS) data that can geo-reference data points and identify water from land.

FIG. 2 illustrates a processing diagram that includes classification module 14, the latter combining a geo-referenced point cloud dataset with GIS metadata and classifying a region as either land or water. Based on this classification by module 14, only point cloud data identified as land is used for terrain processing by module 16. The terrain processing module 16 includes a series of routines and sub-routines to determine slope and roughness of a terrain, as well as vertical obstructions (VOs) and line of sight calculations, if needed. Thresholds are used by the present invention with respect to the aircraft's requirements and mission profile to determine acceptable regions to land the aircraft according to terrain slope, roughness, and distance from a vertical obstruction.

An example of a criteria for a safe landing zone includes the required landing area, terrain slope, distance from vertical obstruction, terrain roughness (obstructions or hazards), and flatness of the landing zone. Each criterion may be defined as follows:

Landing area: A required aerial measurement and shape that quantifies a safe landing area based on aircraft requirements.

Terrain slope: The-slope of the terrain based on a height map (HM). The HM is a type of digital elevation map (DEM) created by terrain processing module 16, and may also contain information of man-made structures.

Terrain roughness: Roughness is used to determine vertical obstructions (VOs), hazards, and/or obstacles.

Distance from a VO: This determines minimum distance from a vertical obstruction to the center of a landing region.

Flatness: This determines any variation in height of the data points inside a possible landing zone.

Line of Sight: This determines radial distances as a function of altitude. This generates a cone in 3D space. The width of this cone is a function of height and is used to further rank possible landing zones for ease of entry as the aircraft approaches a respective landing zone on the ground.

In accordance with an embodiment of the present invention, a method of determining, in real-time, an acceptable aircraft landing zone, for example, a helicopter landing zone (HLZ), is shown in greater detail in FIGS. 2 and 3. As shown, the method, generally designated as 10, includes six processing modules, namely, parameters processing module 15, point cloud data processing module 12, classification processing module 14, terrain processing module 16, landing zone detection module 18, and landing zone filtering module 20. These modules are described below.

The parameters and point cloud data modules determine characteristics of a scene which has been imaged by a LADAR system. The parameters include a required landing zone, metadata, mission requirements, geographic GIS data, digital elevation maps and weather constraints. The parameters module and the point cloud data module are used as input data to classification module 14. The classification module 14 essentially classifies an area as being land or water, based on the inputted parameters and point cloud data. If the area is not land, then module 14 loops back to module 12 to find another landing area. This other area is then newly classified as land or water. If the area is determined to be land, however, the method proceeds to further process the area data through terrain processing module 16.

The parameters (such as preplanned flight routes, mission parameters, digital elevation map (DEM), geographic information system (GIS) data, and weather data) are used to determine if the data acquired within a scene is land or water. Combining GPS and IMU data, the point cloud data may be segmented so that only point cloud data with sufficient land (not water) is pushed to the terrain processing module.

It will be understood that LADAR point cloud data by itself is not sufficient to distinguish a landing site as water or land, at wavelengths that are reflected and not absorbed by water. However, method 10 can be executed without these data sources with the understanding that water and land have not been segmented. Regions that meet criteria for landing based on the point cloud dataset alone may then be identified as a potential landing zone, regardless of whether the zone is land or water.

The terrain processing module 16 is used to determine point cloud characteristics that have been identified as land data. First, the 3D point cloud at any time frame, t, is converted to Cartesian coordinates (x, y, z) from either the geo-reference data (determined by the GPS) or scanning angles and altitude data (if GPS is not available).

From the 3D data, a height map (HM) is generated by HM unit 51, based on a 2D image projection from the sensor's position. The intensity values of the HM correspond to measurements of height. After the HM unit generates the HM, the height map is filtered by way of enhancement unit 52, which distinguishes edges within the image, and generates an enhanced height map (EHM). For example, in a scene of a forest and flat ground, the EHM shows the edges of the trees with respect to the flat ground. The method next determines the first and second order gradients within the image by way of gradient unit 54. The gradients are used to determine edges of any objects and to segment these objects as possible vertical obstructions (VOs) or hazards to the aircraft.

The height map is a 2D image where the pixel values are the measured height over the sampled scene. The height map is also known as a 2.5D image. The algorithm enhances the height map by using a Laplacian filter for sharpening the image. A Fast Fourier Transform (FFT) algorithm is used for speeding the computation needed for sharpening the image. Once the height map is enhanced, the algorithm uses Laplacian gradients to determine the edges. The edges are used for computing the boundaries of each object in the image. Boundaries are determined by the usage of Fourier descriptors.

To implement the enhanced filter a mask, h(x,y), is used by the present invention, as shown in FIG. 5A.

An FFT is applied over the height map (I(x,y)) and over the mask (h(x,y)) to form an enhanced filter. Then, the enhanced image is determined by moving the enhanced filter in the frequency domain over the entire image and multiplying both. Finally, the enhanced image is stored in a new array, as shown in FIG. 5B. In other words, the algorithm multiplies the mask presented in FIG. 5A, where i and j are the positions of each pixel, with the height values in the height map to form the new array. Once the new array is generated, it is converted into the spatial domain by applying the inverse FFT ($FFT^{-1}$). The multiplication in the frequency domain is pixel-by-pixel.

The algorithm, by way of gradient unit 54, determines the first and second gradients which are used for detecting the edges. The gradients are determined by the following equations:

$$G_x = [Z(i-1,j-1)+Z(i+1,j)+Z(i+1,j+1)]-[Z(i,j-1)+Z(i,j-1)+Z(i+j)] \quad (1)$$

$$G_y = [Z(i-1,j-1)+Z(i-1,j)+Z(i-1,j-1)]-[Z(i+1,j)+Z(i+1,j)+Z(i,j+1)] \quad (2)$$

where an edge is defined by $[G_x^2+G_y^2]^{1/2}$ and orientation of the edge is defined by $\tan^{-1}(G_x/G_y)$.

In one embodiment, the algorithm generates a black and white image which stores the edges. The edges are represented by ones (1), while the rest of the pixels are represented by zeroes (0). In this case, information is lost in the edges of the image, because the algorithm moves the mask presented in FIG. 5B, stores the values from the enhanced height map and performs the calculations required for determining the edges and records only the value in the pixel (i, j).

The output from enhancement unit 52 (FIG. 3) is used by the present invention to determine the roughness of the terrain and the flatness of possible landing sites. Based on predetermined thresholds, VO unit 58, flatness unit 53 and roughness unit 56 categorize features within a scene as being hazardous for a landing, sufficiently flat for a landing, or too rough for a landing, respectively. For example, a boulder field, or small objects in a field may be too rough for an acceptable landing site.

In an embodiment of the present invention, terrain processing module 16 determines the roughness of the terrain by taking an absolute value of the subtraction between the HM and the EHM. The present invention associates the roughness of the terrain with the standard deviation and the variance of the terrain values between the HM and the EHM. The larger the standard deviation, the more likely the scene is populated by hazardous objects that may make landing difficult and dangerous.

However, as the aircraft descends, the ground space distance (GSD) value of the data changes, providing greater detail as the altitude decreases. It is possible for tall grass at low altitudes with smaller GSD data points to show a large variance from the HM. Filtering based on the GSD allows greater fidelity to the landing zone identification. This is the flatness test that is calculated by flatness unit 53.

Finally, slopes within a 3×3 moving window across the HM are calculated is by slope unit 55, using the four nearest neighbors with respect to a center pixel of the window. FIG. 5C illustrates an example of a mask for the moving window, shown as a 3×3 window. The height values of the corresponding nearest neighboring pixels of the center pixel are temporarily stored and used to determine the slope in the x direction (Equation 3) and the y direction (Equation 4). From Equations 3 and 4, the final slope value of the center pixel within the moving window is calculated, as shown in Equation 5 below:

$$S_x = \frac{HM(i+1, j) - HM(i-1, j)}{6xGSD_x} \quad (3)$$

$$S_y = \frac{HM(i, j+1) - HM(i, j-1)}{6xGSD_y} \quad (4)$$

$$\text{Slope}(i,j) = \sqrt{S_x^2 + S_y^2} \quad (5)$$

It will be appreciated that, in Equations 3 and 4, each slope in the x or y direction is dependent upon the GSD. If the absolute GSD is not provided in the metadata, then there are alternative measures of GSD that may be available on the aircraft. Using pixel size and the field of view at the time the frame is acquired may be used to calculate the GSD. A pseudo-GSD may also be generated by the point cloud data, based on height and cross range measurements between points. The more reliable the GSD in the x and y directions, the more reliable the slope map is for determining a safe landing zone (or an acceptable landing zone).

It will also be appreciated that flat regions, or the flatness of an image is determined by the distribution of points in the image. If the distribution is not flat in a region that is known to be flat, then the system is not accurate, and a processing concept is applied for correcting the point cloud. A standard deviation of the area of interest is used for storing uniform distributed points. In the algorithm, a flat region requires a standard deviation of less than 0.3. A similar concept is used for determining the roughness of a scene. The threshold, however, depends on the aircraft's specification.

Once the slope map and vertical obstruction (VO) map are determined, the algorithm uses a new moving mask which is based on the required area that the helicopter needs for a landing. For example, assume that the helicopter needs a landing area of 10 m×10 m. The algorithm then forms a 10 m×10 m mask and moves the mask around the VO map, the slope map, and the enhanced map. In the enhanced map, the algorithm stores all the points inside the mask, and determines the flatness and roughness of the terrain inside the mask by using the afore-mentioned standard deviation criterion. The possible landing zones are determined as follows:

(a) If there are no VOs, (b) if the slope is less than the threshold slope which is determined by the aircraft specifications, pilot's risk, and mission, and (c) if the roughness of the terrain does not represent a risk, the landing zone is considered a possible landing zone.

Pseudo Code:
If Roughness<$R_{th}$ & Slope<$S_{th}$ & VO<$V_{th}$
Possible Landing Zone
Else
This region does not have the requirements for a safe landing.

Using a mask of the same area size that is required for a landing area has the advantage of detecting squared areas and not one large area with many possible non-uniformities. If a large area is used, by the present invention, the entire area is marked with many squares, in which each square is a possible landing zone.

For determining an optimum landing zone, however, the algorithm uses a funnel method, which is described later. The funnel is an imaginary approach for determining distances from an obstruction and distances from a center of the landing zone. The funnel method considers the descending angle and direction of the aircraft for ranking the possible landing zones. The landing zones are ranked in order, where the first one is optimum and the last one is a high risk for landing and likely not safe.

Figure 6:
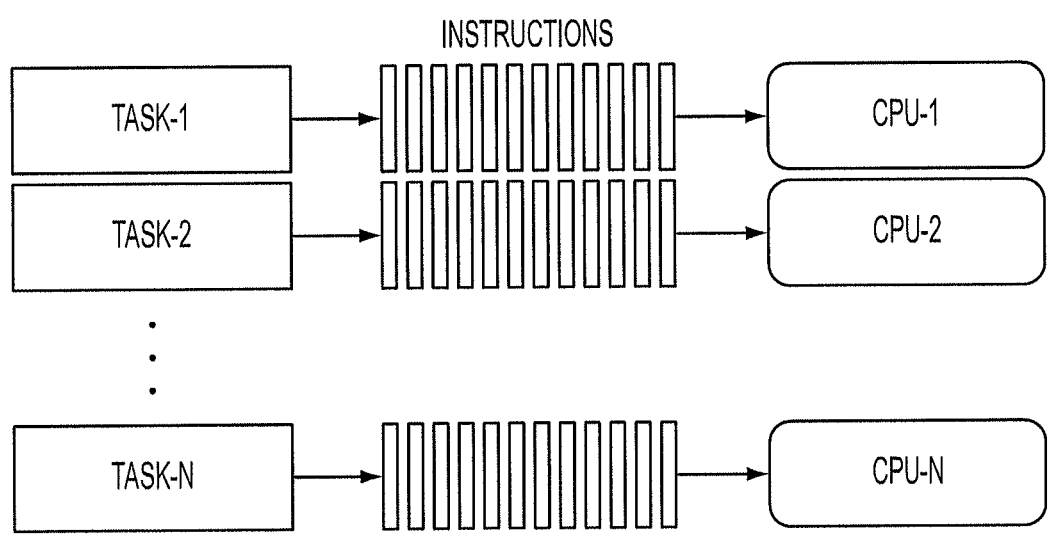
FIG. 6 is an exemplary parallel processor used by the present invention to speed up visualization of a landing zone to a pilot, in accordance with an embodiment of the present invention.

By using parallel computers, the algorithm is able to task different processors to perform different computations at the same time. For example, one CPU may be used to compute the slope of the terrain, while another CPU may be used to determine the gradients and VOs of the terrain. Meanwhile, another CPU may be used to determine the roughness and flatness of the enhanced height map. Parallel processing results in a reduction of processing time. FIG. 6 shows a block diagram of a parallel computing processor, as one embodiment of the present invention. As shown, parallel computing requires dividing the algorithm into multiple tasks, then dividing each task into a series of instructions and, finally, separating the series of instructions so that each series is executed simultaneously by a different CPU.

Obtaining a height map, the present invention uses a series of image processing techniques. The 3D point cloud is converted into a 2D raster data set (2D image array), where the value of each pixel corresponds to the height (z) of each sampled point. Rastering converts random sampled points into a series of discrete vectors to create an array. Rastering starts with a statement that point cloud data is projected into Cartesian coordinates (x,y,z), where the values of x and y are a function of the sensor scanning angle, and z is height. To convert the data into a rastered 2D array, the algorithm may use the following:

Rastering Pseudo Code:
1. Find the minimum and maximum of each coordinate.
[xMin, yMin, zMin]=[min(x), min(y), min(z)]
[xMax, yMax, zMax]=[max(x), max(y), max(z)]
2. Determine the total number of points, L.
L=length(ptCloud(x,y,z))
3. Estimates the resolution of the system across x and y.
xRes=average($x_{i+1}-x_i$) for i=1, 2, . . . , L−1
yRes=average($y_{i+1}-y_i$) for i=1, 2, . . . , L−1

4. Creates a 2-D array by filing the array (H(m,n)):

$$m_i = \text{round}\left(\frac{x_i - x\text{Min}}{x\text{Res}}\right) + 1$$

$$n_i = \text{round}\left(\frac{y_i - y\text{Min}}{y\text{Res}}\right) + 1$$

Where $i = 1, 2, \ldots, L$ $$I(m_i, n_i) = ptCloud(x_i, y_i, z_i)$$

Figure 7:
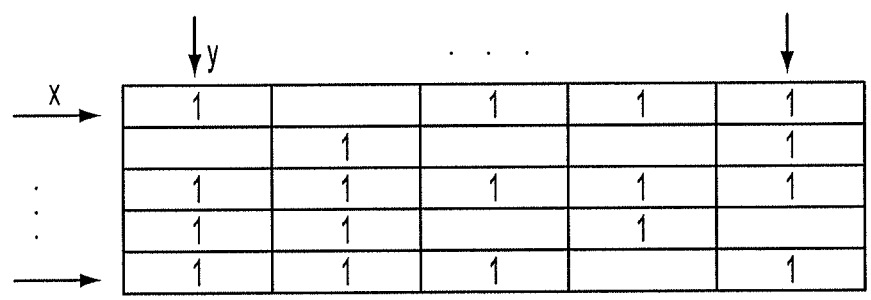
FIG. 7 is an example of a height map including empty spaces being filled by interpolation, in accordance with an embodiment of the present invention.

The algorithm only uses one counting variable to store all the points in the point cloud and then uses the same loop to fill the height map (I). Once the matrix (I) is created, the algorithm needs to fill the spaces that are blank, which represent missed points (points not scanned by the LIDAR). To fill that empty space the algorithm interpolates each column and row, as illustrated in FIG. 7. Each empty space, or pixel is estimated by interpolation across z and along y.

Image enhancement, as performed by enhancement unit 52 in FIG. 3, will now be described. Image enhancement filtering detects small variations in the terrain. Small variations in the terrain may be correlated with rocks, weeds, small man-made structures or objects, etc. To implement image enhancement the HLZ algorithm uses a high-boost-Laplacian sharpening filter in the frequency domain, as follows:

Let g(x,y) be the enhanced image as determined by Equation (6):

$$g(x,y) = I(x,y) - \nabla^2 I(x,y) \tag{6}$$

The term I(x,y) represents the original image and $\nabla^2$ is the second order Laplacian which includes second order derivatives. To implement Eq. (6) in the frequency domain, the following transfer function is defined:

$$H(u, v) = 1 - \left[\left(u - \frac{M}{2}\right)^2 - \left(v - \frac{N}{2}\right)^2\right] \tag{7}$$

Next, a filtered signal is obtained with an inverse transform operation, is presented in Eq. 8:

$$g(x, y) = \mathfrak{I}^{-1}\{H(u, v)\} = \mathfrak{I}^{-1}\left\{\left[1 - \left[\left(u - \frac{M}{2}\right)^2 - \left(v - \frac{N}{2}\right)^2\right]\right]F(u, v)\right\} \tag{8}$$

The term F(u,v) is the original image (I(x,y)) in the frequency domain.

Figure 8:
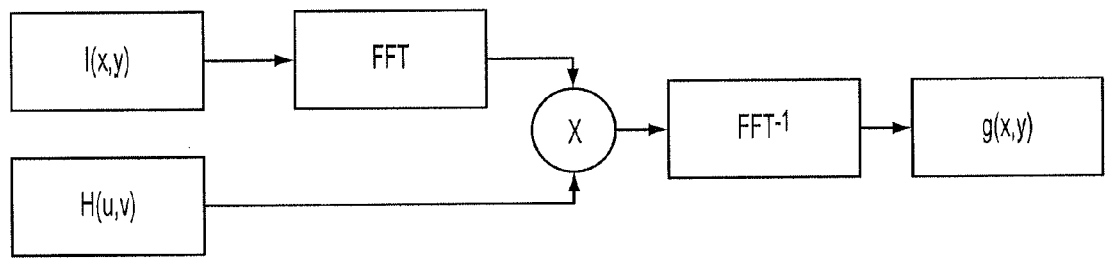
FIG. 8 is a block diagram of a filter applied in the frequency domain, in accordance with an embodiment of the present invention.

In the time domain, the filtering of a signal is achieved by using convolution. Convolution of discrete signals, however, is time-consuming. In the frequency domain, however, the filtered signal may be obtained by multiplying the image by the transfer function or filter response, as shown in the block diagram presented in FIG. 8. Real-time signal processing by the present invention uses a fast Fourier transform (FFT) to filter data in multiple dimensions. The advantage of FFT is that it may be implemented in FPGA acceleration cards, DSP-16 real-time, or other type of DSP cards, which are capable of operating above real-time rates.

The Laplacian filter is combined with a high-boost filter. The high-boost filter is used to emphasize high frequency components in the image. A high frequency component helps differentiate objects and changes in the terrain due to discontinuities. The high-boost filtering concept is presented in Eq. 9:

$$I_{hb}(x,y) = (A-1)I(x,y) + I_{hp}(x,y) \tag{9}$$

When A is equal to one, the high-boost (hb) filter is reduced to a normal high pass (hp) filter. If A is greater than 1, the contribution of the image is dominant. If A is less than one, however, the contribution of the filter is dominant. The high-boost filter in the frequency domain is implemented with the following composite filter:

$$H_{hb}(u,v) = (A-1) + H_{hp}(u,v) \tag{10}$$

where $H_{hp}$ represents a high pass filter and is determined by Eq. (7).

Figure 9:
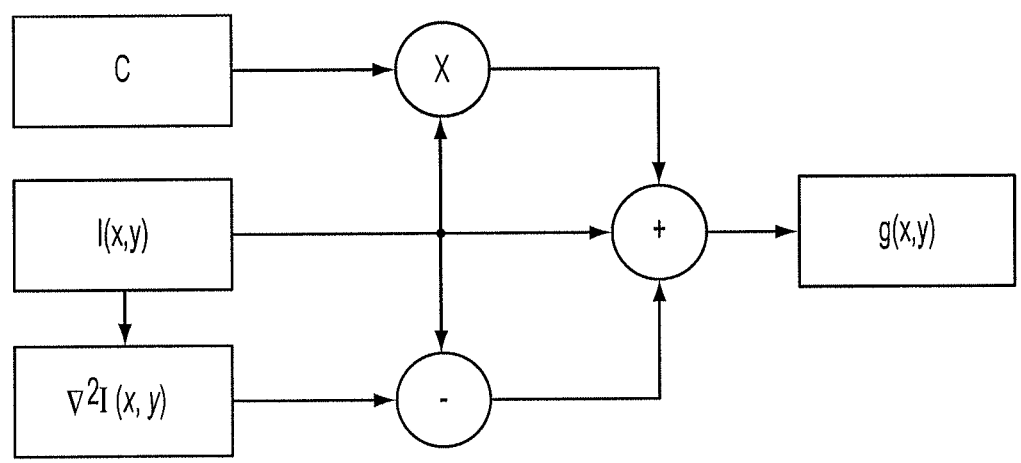
FIG. 9 is a block diagram of an image enhancement filter in the spatial domain, in accordance with an embodiment of the present invention.

The high-boost filter is used to un-sharpen an image. Mathematically, the implemented filter is given by Eq. (11) which is also illustrated as a bock diagram in FIG. 9:

$$g(x,y) = C*I(x,y) + I(x,y) - E^2 I(x,y) \tag{11}$$

Figure 10:
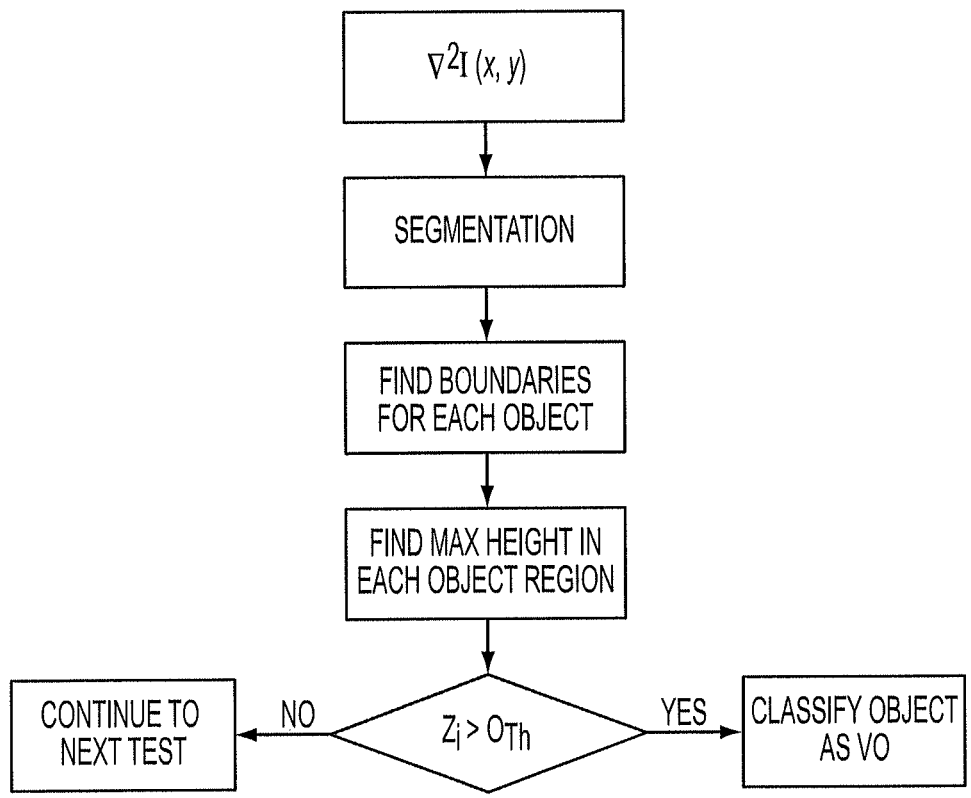
FIG. 10 is a flow chart depicting a method of detecting vertical obstructions (VOs), in accordance with an embodiment of the present invention.

For determining a vertical obstruction (VO) the algorithm takes advantage of the calculations done by image enhancement unit 52. The gradient of the height map is used for segmenting the image by segmentation unit 57, since gradients are used for detecting the edges of different objects in the image. Then, those edges are translated into a boundary of each object in the image. Once the boundary of each object is determined, the algorithm checks the distribution of points inside each boundary. If inside each boundary there are points larger than a predetermined height, the algorithm classifies the object inside the boundary region as a vertical obstruction (VO). FIG. 10 shows a block diagram for detecting a vertical obstruction.

The present invention also takes advantage of previous computations for improving efficiency of the algorithm. Re-using calculations helps to minimize the processing time of the HLZ algorithm. In the image enhancement process, gradients are used for implementing a filter bank, which are also used to determine the edges of the enhanced image. Finding the edges in the enhanced image has the advantage that small features in the scene may be detected. The gradient operators are based on derivatives shown in Eq. 12 below:

$$\nabla I = \begin{bmatrix} G_x \\ G_y \end{bmatrix} = \begin{bmatrix} \frac{\partial I}{\partial x} \\ \frac{\partial I}{\partial y} \end{bmatrix} \tag{12}$$

$$|\nabla I| = \sqrt{G_x^2 + G_y^2} \tag{13}$$

The direction of each edge ($\alpha$) helps determine the orientation of each edge, as follows:

$$\alpha(x, y) = \tan^{-1}\left(\frac{G_y}{G_x}\right) \tag{14}$$

Once the edges are determined (by Eq. 13), the algorithm proceeds to link the edges to perform boundary detection. The properties used for determining similar edge points are given by the strength of the response of the gradient operator and the direction of the gradient vector. An edge pixel with coordinates $(x_0, y_0)$ in a predefined neighborhood of (x,y), is similar in magnitude and angle to the pixel at (x,y) if the following are true:

$$|\nabla I(x,y) - \nabla I(x_0,y_0)| \leq T_E \tag{15}$$

$$|\alpha(x,y) - \alpha(x_0,y_0)| \leq T_A \tag{16}$$

where $T_E$ and $T_A$ are a non-negative edge and an angle threshold, respectively.

A point in a predefined neighborhood is linked to the pixel at (x,y), if both magnitude and direction criteria are satisfied as presented by Equations 15 and 16. Once the edges are determined, the algorithm proceeds to generate vectors for representing the edges of each object. Euclidian distance is used to determine those pixels that belong to one object, as follows:

$E(x,y) \in O_k(x,y)$ if the distance is close, otherwise the pixel is part of another class.

$E(x,y)$ is the edge's pixel and $O_k$ represents the object where the edge pixel belongs.

For connecting all the edge pixels that belong to each object ($O_k(x,y)$) and estimating the objects shape, Fourier descriptors are used. Fourier descriptors estimate the contours of each object. Contours are vectors that represent a boundary of an object in the plane of x,y. The steps used in the algorithm are the following:

1. Define a complex vector using coordinates (x,y):

If the edge image is given by a white and back image where the pixel values of the edges are equal to 1 and the rest are equal to 0, the complex vector is generated by using the x and y positions of each pixel equal to 1. But, we used this concept for each estimated object. The complex vector is defined by:

$$\vec{U} = \{x + iy\}.$$

2. Apply the 1D Fourier transform, by using the following equation:

$$F = FFT\{\vec{U}\} = \sum_{k=0}^{N-1} \vec{U}_k \exp\left(-\frac{2\pi i}{N} k\mu\right) \quad (17)$$

Then, those edges may be used to find the boundaries of each detected object by linking them into vectors. In other words, this approach produces object contours.

Algorithm Pseudo Code:

1. Evaluate all edges: a sequence of cracked edges can be part of the boundary of one object if the connections of them form a pattern.

$$R_{ij} = \sum_{i=1}^{M} \sum_{j=1}^{N} w_{ij} z_{ij},$$

where $R_{ij}$ represent the pixels of the edges.

2. Edge filtering: this approach helps to minimize the number of spurious edges.

Find $R_{ij} > T$, i=1, 2, ..., M and j=1, 2, ..., N, and T is the threshold value.

3. Determine the Euclidian distance of each edge pixel (R)

Returning next to FIGS. 3 and 4, after the HM, EHM, slope, flatness and roughness have been determined by terrain processing module 16, various threshold parameters are used to filter regions that meet aircraft landing criteria. The values for the threshold parameters used by the present invention are $RO_{th}$ (roughness), $VO_{th}$ (vertical obstruction distance), and $S_{th}$ (ground slope). These threshold values are used in landing zone detection module 18 as criteria for decision boxes $RO_{th}$ (roughness) 22, $VO_{th}$ (vertical obstruction distance) 24, and $S_{th}$ (ground slope) 26, respectively.

If the roughness is less than or equal to the roughness threshold, a possible landing zone flag is provided to unit 28. If the vertical obstruction is less than or equal to the vertical obstruction threshold, a possible landing zone flag is provided to unit 28. Lastly, if the ground slope is less than or equal to the ground slope threshold, a possible landing zone flag is provided to unit 28. Thus, landing zone detection module 18 provides possible landing zones to the aircraft.

Values, such as slopes between 7-15° for most aircraft, 10 feet clearance for vertical obstructions, and roughness values of 0.44 meter or greater are examples of typical threshold values. Each aircraft has different specifications and, therefore, the parameters are adjusted based on the required landing zone (RLZ) values, which are provided as metadata by parameters module 15.

The aforementioned parameter values provide opportunities for safe landing, but as in automobile GPS devices, there are other factors that help segregate good landing zones from great landing zones. Parameters such as weather requirements (e.g. wind speed and humidity) may affect landing zone selections, as well as the nearest landing zone along a predefined flight path, and the line of sight (LOS) cone to the landing zone of interest. All these parameters are optional, but may be used to define the best landing zone, the best approach for the landing zone, and the best position to center the aircraft within the landing zone. The best landing zone is determined by landing zone filtering module 20, which outputs a safe landing zone by safe landing zone unit 44.

As shown, landing zone filtering module 20 compares the selected landing zone area (unit 32) against a desirable area based on weather conditions. Decision box 40 determines whether the selected landing area is greater than or equal to the desirable landing area. If it is, then safe landing zone unit 44 may provide a safe landing flag for the selected landing zone area. Next, the VO distance (unit 38) and the selected landing zone center (unit 34) are compared against a desired distance by decision box 42. If decision box 42 determines that the VO distance is greater than or equal to the desired distance, then a flag is provided to the safe landing zone unit 44. Finally, LOS unit 36 provides the LOS cone parameters to the safe landing zone unit 44.

In addition to the aforementioned steps, method 10 verifies if there is a GPS and GIS available. If either one of these systems or metadata is available, the method, by way of classification module 14, classifies the point cloud dataset as including land or water data points. If GIS data is not available, however, the method may fail by classifying water regions as landing zones.

The method 10 generates a height map (HM) based on the point cloud dataset. After the HM is available, the method enhances the HM using filter unit 52 by improving the details of features and/or edges. The filtered HM is preferred to as an enhanced height map (EHM).

The method uses the HM to calculate the slope of the terrain by way of slope unit 55.

Vertical obstruction (VO) unit 58 determines any VO by using the segments resulting from the gradient calculation. Gradient unit 54 determines discontinuities across the HM and associates the discontinuities with vertical is obstructions.

Every map (HM, EHM, slope and VO) may be of the same size.

The method 10 generates a possible landing zone map (PLZM) and sets every pixel equal to zero that corresponds to a possible landing zone.

To improve the computing speed, method 10 creates a moving mask of the same size and shape of the required landing zone. This mask is used to store the pixel values of each map and then to compare every map in the same location. The method computes the roughness of the terrain and makes comparisons of each parameter with pre-defined thresholds. This generates possible landing zones. The possible landing zones are preferably of the same size or larger than the required landing area.

The method 10 proceeds to filter the landing zones based on optional parameters by way of filtering module 20. The process ranks the possible landing zones from low risk to high risk. First, the method ranks the landing zones by aerial size in descending order. Next, the method determines the center of each landing zone and determines the distances between each landing zone and VO. Finally, the method determines the LOS and ranks landing zones with low and high visibility as a function of height. This essentially weighs each landing zone by the shape of a cone generated from the LOS.

The landing zone filtering module 20 will now be described in greater detail. The landing zone filtering module 20 executes landing zone filtering of all landing zones detected by landing zone detection module 18. The landing zone filtering module combines the required area for an aircraft landing, the distance between the center of the landing zone and the vertical obstructions (VOs), and the line of sight (LOS) from the aircraft.

Figure 11:
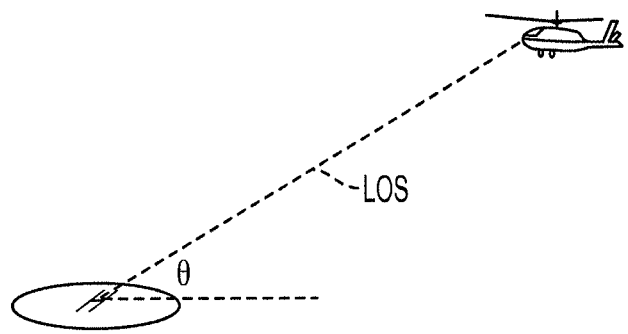
FIG. 11 depicts a line of sight (LOS) between a helicopter and a landing zone, H.
Figure 12A:
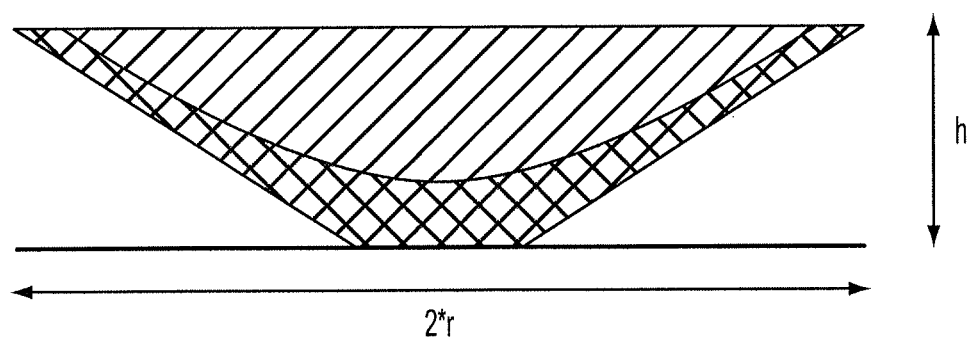
FIGS. 12A, 12B, 12C and 12D are examples of a funnel formed by the present invention.

For filtering the detected landing zones, the filtering module uses an imaginary cone which is located in the center of each landing zone to determine a vertical obstruction in a possible landing path. The VOs are all objects that represent a risk for landing in a specific area. The LOS is based on an imaginary line that drives the pilot through the center of the landing zone. From another point-of-view, the LOS is an imaginary line from the center of the landing zone through the helicopter. FIG. 11 shows the LOS as defined by the present invention. Generally, the landing path depends on the specifications of the aircraft (size, weight, hardware, mission, etc.). If the helicopter flies around the landing zone, designated by H, an imaginary cone or funnel in 3D space is formed. FIG. 12A shows an imaginary funnel (cone) in 3D space where the lower radius of the funnel is based on the helicopter landing area and the upper radius is based on the LOS angle or landing path required for a safe landing. The height of the funnel is based on the helicopter height at a specific distance from the landing zone.

To minimize computations in the algorithm, the funnel method is used to determine the VO surrounding the landing area. Recall, the radius at the base of the funnel is based on the required landing area and the VOs are then objects inside the funnel.

Figure 12B:
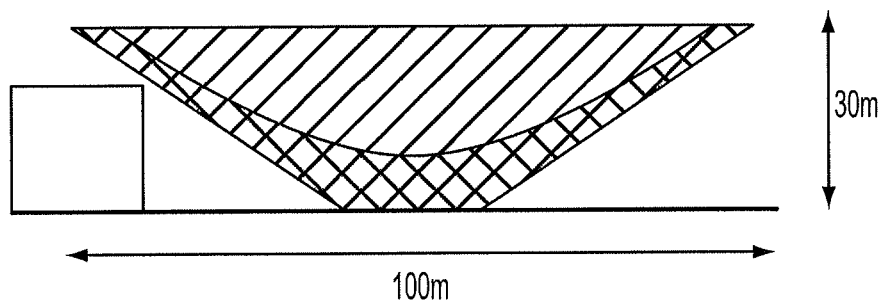

FIG. 12B presents an example of the funnel being close to a VO, such as a building positioned at the left side of the funnel. In the example, the building is not considered a risk, because it is outside of funnel. Generally, the LOS angle is between 30-45 degrees, depending on the aircraft specification and mission. The funnel in FIG. 12B shows a clear area for safe landing.

Figure 12C:
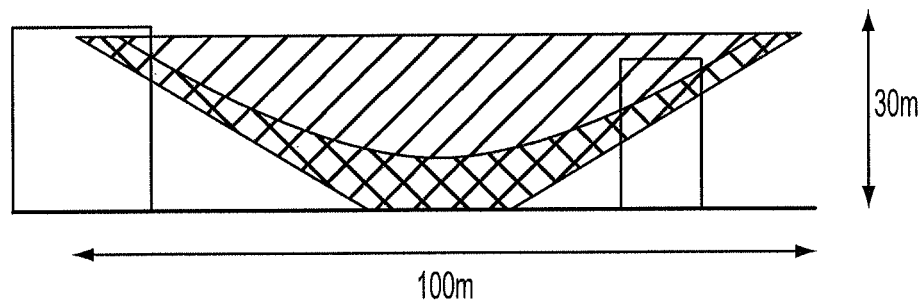

FIG. 12C shows a second example in which two objects are inside the funnel. Both objects are buildings obstructing a landing zone. If there are objects inside the funnel area, the algorithm ranks the landing area as a risky one. In ranking the landing zones, the algorithm considers the distance of each object from the center of the funnel. In case that all possible landing areas have obstructions, the algorithm recommends the area where the obstruction is farther from the center of the cone.

Figure 12D:
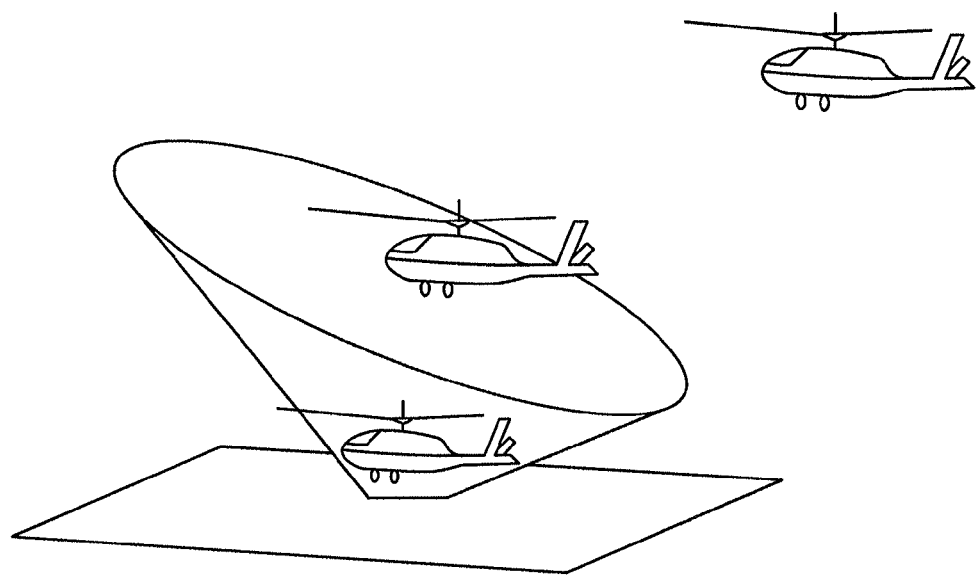

Furthermore, the funnel method of the present invention is not limited to a single position. The funnel may be oriented in different angles to verify if the pilot is able to land quickly into a specific area. Here, the LOS is projected through the center of the funnel, which is the path that the pilot should follow for a safe landing. In FIG. 12D the funnel is oriented using the LOS concept. The funnel is important in real-time applications where the LIDAR is attached to the aircraft and the imaginary line from the helicopter through the landing zone is the route that the pilot needs to follow.

The present invention advantageously speeds up the algorithm by projecting the detected VOs into a 2D circle, which has a radius equal to the upper radius of the funnel. Funnels with VOs close to the center of the funnel are considered landing zones of high risk. Landing zones with VOs far from the landing area are considered safe. Perfect landing zones are those landing zones without VOs inside the funnel. The algorithm of the present invention uses the 2D circle projection to estimate the optimum landing path. Having obstructions close to the landing zone represents a risk if the landing path is in a specific direction. But, other landing paths may be considered.

Figure 13:
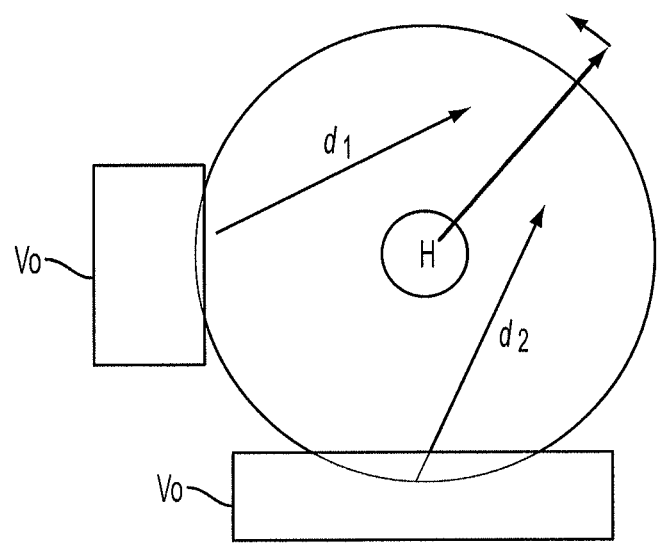
FIG. 13 depicts an optimum path for landing a helicopter provided to a visualization system, in accordance with an embodiment of the present invention.

As an example, FIG. 13 presents a predicted optimum landing path. The figure illustrates a cone from a top-view where the small circle at the center (with a small "H") represents the landing zone area. The VOs represent obstacles, i.e., buildings. An imaginary vector rotates counter-clockwise to determine the distance between each obstruction and the center of the landing area. Once those distances are determined, the imaginary vector is moved into a position where the obstacles are far away. Following the example shown in FIG. 13, the vector is moved into a position where the distances $d_1$ and $d_2$ are a maximum. This position is the optimum direction for landing.

Figure 14:
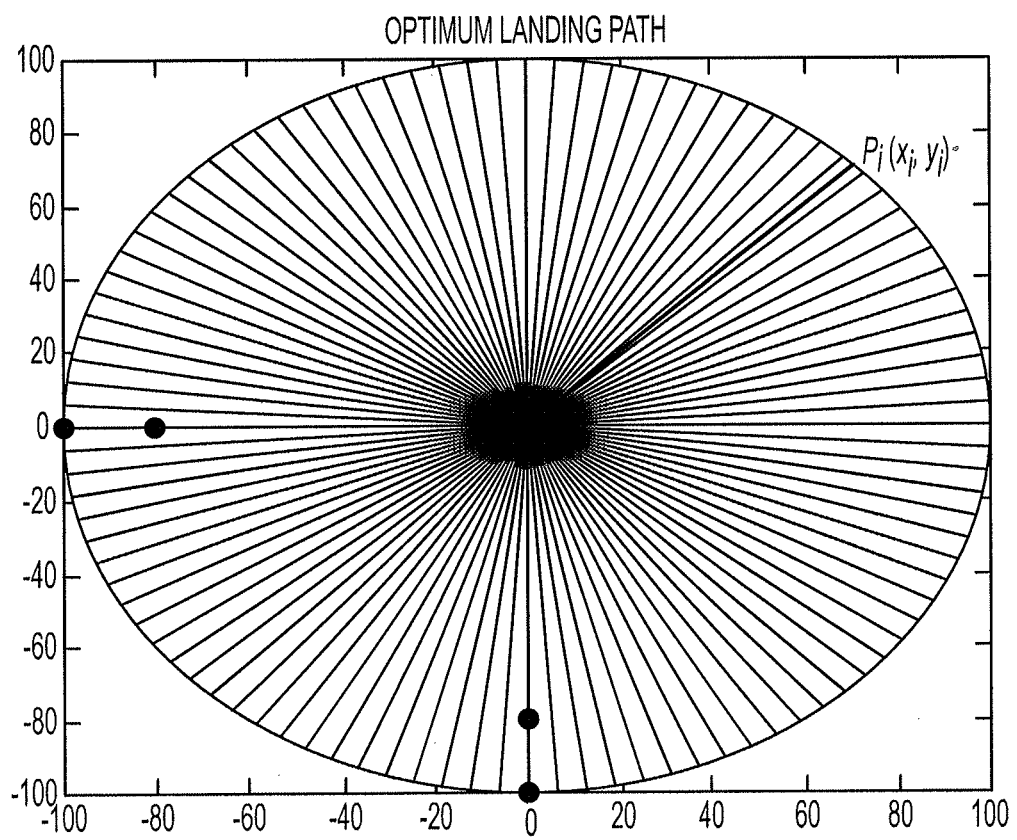
FIG. 14 depicts another example of an optimum path for landing a helicopter provided to a visualization system, in accordance with an embodiment of the present invention.

FIG. 14 shows an example of how an optimum landing path is determined. The algorithm considers all objects inside the funnel and determines the distances and upper boundary of the funnel. FIG. 14 is a top view of the funnel where each line represents the position of the rotational vector, and the points represents the objects inside the funnel. The end of each rotational vector around the circle is represented by $P_i(x,y)$ which is used to determine the distance of a detected object inside the funnel and the boundary of the circle. The optimum landing path is determined by selecting the point around the circle with the maximum distance and its projection through the center of the circle.

The following PSEUDO code is an example of how a decision for an optimum landing path may be made by the present invention:

1. If an object is detected inside of the cone or funnel:
   a. Determine distance $(d_i)$ between object $(O_k(x,y))$ and each point in the border of the funnel $(P_i(x,y))$; where $P_i$ and $d_i$ are calculated by using Eq. 18 and 19, respectively.

$$P_i(x,y)=(r\cos(\theta), r\sin(\theta)) \tag{18}$$

$$d_i=\sqrt{(P(x)_i-O(x))^2+(P(y)_i-O(y))^2} \tag{19}$$

b. Determine the maximum distance and its location, $P_{max}$.

$$P_{max}(x,y)=P_{max(d_i)}(X,y) \tag{20}$$

c. Determine the directional vector by using Eq.21; where r is the maximum radius of the funnel, and $v_{x0}$ and $v_{y0}$ represent the coordinates of the center of the funnel. This vector is always pointing outside the funnel.

$$\begin{bmatrix} \vec{v}_x \\ \vec{v}_y \end{bmatrix} = \begin{bmatrix} v_{x0} \\ v_{y0} \end{bmatrix} + r \begin{bmatrix} P_{max}(x) \\ P_{max}(y) \end{bmatrix} \tag{21}$$

d. The direction of the vector is the recommended landing path.

2. Else, the landing path can be in any direction.

Finally, the method 10 overlays the determined safe landing zones in white and marks the center of each landing zone with a pink "H".

It will be appreciated that method 10 ingests any type of LADAR point cloud data. Whether it is a full motion LADAR system or a static collection of video frames, the method offers a safe landing zone within a short period of time. For real time scenarios, the operator (pilot) may use the present invention to find safe landing zones when a full motion video LADAR is used. The method 10 generates much smaller datasets, frame to frame, which enables a safe landing zone to be generated and displayed in real-time.

It will be further appreciated that presently the SLAD algorithm is the only algorithm that determines safe landing zones, but only when enough data of an entire region has been collected by stereo pair cameras. Since the data is only minutes old, an assumption is made that the ground terrain does not change much during that time period. This enables the pilot to make decisions during landing maneuvers. The SLAD algorithm allows the pilot to find landing zones based on roughness and slope of the stereo pair cameras, but uses a very different algorithm to do so. To find landing zones that are safe, the algorithm uses set circles of regions that pass roughness and slope tests. Each circle starts growing and stops when a possible obstruction is crossed. Next, the algorithm selects circles with ratios equal to or larger than the required landing area. This concept of growing circles is computationally expensive, and limits the real-time requirements that are necessary when changes in a scene occur in seconds, not minutes. Since the present invention uses a moving window mask to find regions that meet the aircraft requirements, the present invention processes video rate point cloud data for real-time situational awareness. The landing zone ranking order changes based on moving objects in the scene on millisecond time scales. This timescale is essential for real-time situational awareness.

Feature extraction by other active sensing applications, such as bathymetry for semi-submersibles, subsurface sea mines, etc. require similar concepts as method 100. By changing the feature of interest from flat surfaces to spherical surfaces of specific sizes (e.g. subsurface mines), the method may generate a map of spherical objects within a video rate point cloud dataset in real-time. Real time feature extraction is possible when video rate LADAR systems are used.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of selecting a safe landing zone for an aircraft comprising the steps of:
    receiving, from a LADAR or LIDAR system, 4 dimensional (4D) point cloud data as sequential image frames;
    referencing, by a processor, each image frame to geographic coordinates;
    selecting, by a processor, a land region in each image frame;
    first filtering the land region, by a processor, to select a landing zone for the aircraft; and
    second filtering the landing zone, by a processor, to select a safe landing zone for the aircraft.

2. The method of claim 1 wherein referencing each image frame includes
    using a global positioning system (GPS) or an inertial system to transform the 4D point cloud data into x, y, z geographic coordinates as a function of time, t.

3. The method of claim 1 wherein selecting the land region includes
    determining whether a portion of an image frame includes a land region or a water region, and
    preventing further processing of the portion, after determining that the portion is a water region.

4. The method of claim 3 including the step of:
    transferring, by a processor, the portion of the image frame to the step of first filtering, after determining that the portion is a land region.

5. The method of claim 1 wherein first filtering includes the steps of:
    forming, by a processor, a height map of the land region, the height map including pixel values of height over the land region,
    detecting, by a processor, edges of an object in the height map, the edges forming boundaries of the object,
    finding, by a processor, a maximum height within the boundaries of the object, and
    classifying the object as a vertical obstruction (VO), by a processor, if the maximum height is larger than a predetermined VO threshold value.

6. The method of claim 5 wherein detecting the edges includes the steps of:
    applying a fast Fourier transform (FFT) over the height map to obtain height in a frequency domain,
    calculating gradients of the height in the frequency domain, wherein the gradients define the edges, and
    representing the edges as "ones" and other portions of the height map as "zeroes".

7. The method of claim 6 further including the steps of:
    forming, by a processor, a slope map over the height map, in which a slope of a pixel of interest is based on 4-neighbors of pixels surrounding the pixel of interest, and
    determining, by a processor, roughness over the height map, in which roughness includes a standard deviation of height values greater than 0.3.

8. The method of claim 1 wherein
    first filtering includes the steps of:
    forming a VO map representing vertical obstructions in the land region,
    forming a slope map representing slopes of data points in the land region; and
    second filtering includes the step of:
    moving a mask, defined by a predetermined area for landing, over the land region to select the safe landing zone for the aircraft,
    wherein the safe landing zone includes (a) VOs that are less than a predetermined height within the moving mask and (b) slopes that are less than a standard deviation of height less than 0.3 within the moving mask.

9. The method of claim 8 further including the steps of:
    calculating, by a processor, a funnel extending from a center of a landing zone, wherein the funnel is defined by a line of sight (LOS) projected from the aircraft to the center of the landing zone, and having a height formed by an altitude of the aircraft above the landing zone, and
    classifying, by a processor, the landing zone as a safe landing zone, when a VO is outside the funnel.

10. The method of claim 1 wherein
    first filtering and second filtering are performed by parallel processors.

11. The method of claim 10 wherein
the first and second filtering are executed during a time period sufficient to provide landing visualization in real-time.

12. The method of claim 1 wherein the aircraft is a helicopter.

13. A system for determining a landing zone for an aircraft comprising:
a processor for receiving 4 dimensional (4D) point cloud data from a sensor including a LADAR or LIDAR sensor, the data defined by sequential image frames,
the processor converting each image frame into Cartesian coordinates (x, y, z) to form a height map, in which x and y are a function of a scanning angle of the sensor and z is height,
the processor configured to segment the height map into boundaries of a respective object in the image frame,
the processor configured to find a maximum height within the boundaries of the respective object to form a vertical obstruction (VO) map, and
the processor configured to mathematically move a mask over the VO map, wherein the mask is based on a predetermined landing area required for the aircraft; and
a visualization system for displaying the mask over the VO map for landing the aircraft.

14. The system of claim 13 wherein
the processor is configured to perform the following tasks:
calculating a funnel extending from a center of a landing zone, wherein the funnel is defined by a line of sight (LOS) projected from the aircraft to the center of the landing zone, and having a height formed by an altitude of the aircraft above the landing zone, and
classifying the landing zone as a safe landing zone, when a VO is outside the funnel.

15. The system of claim 13 wherein
the aircraft is a helicopter.

16. A processor for calculating a safe landing zone for an aircraft, the processor executing the following steps:
(a) converting 4D point cloud data into Cartesian coordinates to form a height map of a region, wherein the 4D point cloud data is received from a LADAR or LIDAR sensor;
(b) segmenting the height map to form boundaries of an object in the region;
(c) determining maximum height within the boundaries of the object,
(d) determining if the maximum height is greater than a predetermined height to form a vertical obstruction (VO) in the region; and
(e) determining if the VO is in the line of sight (LOS) of the aircraft to classify the landing zone as safe or unsafe.

17. The processor of claim 16 executing the following additional steps:
(f) determining whether the 4D point cloud data is that of land or water; and
(g) preventing execution of steps (a) through (e), if the 4D point cloud data is that of water.

18. The processor of claim 16 comprising:
a first processor for executing step (a) and
a second processor for executing at least step (b),
wherein the first and second processors are configured to execute the steps in parallel.

19. The processor of claim 16 including the step of:
providing a map of the landing zone to a visualization system during a time period sufficient for real-time landing of the aircraft.

* * * * *